United States Patent [19]

Esser

[11] 4,109,560
[45] Aug. 29, 1978

[54] HORIZONTAL EXTERNAL BROACHING MACHINE

[75] Inventor: Gustav Esser, Solingen, Germany

[73] Assignee: Oswald Forst Maschinenfabrik und Apparatebauanstalt GmbH, Solingen, Germany

[21] Appl. No.: 750,198

[22] Filed: Dec. 13, 1976

[30] Foreign Application Priority Data

Jul. 23, 1976 [DE] Fed. Rep. of Germany ....... 2633098

[51] Int. Cl.$^2$ .............................................. B23D 41/08
[52] U.S. Cl. ..................................................... 90/96
[58] Field of Search .......................... 90/96, 95, 67, 41; 308/3 A

[56] References Cited

U.S. PATENT DOCUMENTS

| 823,833 | 6/1906 | Webb | 90/96 |
| 2,751,821 | 6/1956 | Scrase et al. | 90/96 X |
| 2,902,875 | 9/1959 | Finally et al. | 90/96 X |

Primary Examiner—Harrison L. Hinson
Attorney, Agent, or Firm—Browdy & Neimark

[57] ABSTRACT

A horizontal external broaching machine has a horizontally movable tool slide disposed on a horizontal machine frame. The tool slide, which serves to receive a broaching tool, is supported laterally and vertically, by means of guide surfaces, on guide surfaces of the machine frame. The tool slide is provided with a toothed rack which extends in the direction of movement of the tool slide. A driving pinion, provided with corresponding teeth, meshes with the rack, the pinion being adapted to be driven via a shaft by a drive motor. The center of gravity of the tool slide and of the rack together with the associated drive pinion are disposed on one side of the guide surfaces. The drive pinion is arranged vertically above the rack, the rack and the drive pinion being provided with helical teeth which, during driving in the broaching direction, are acted on by a force directed in the direction of the shaft of the drive pinion and intensifying the bearing forces acting on the guide surfaces for the tool slide.

4 Claims, 7 Drawing Figures

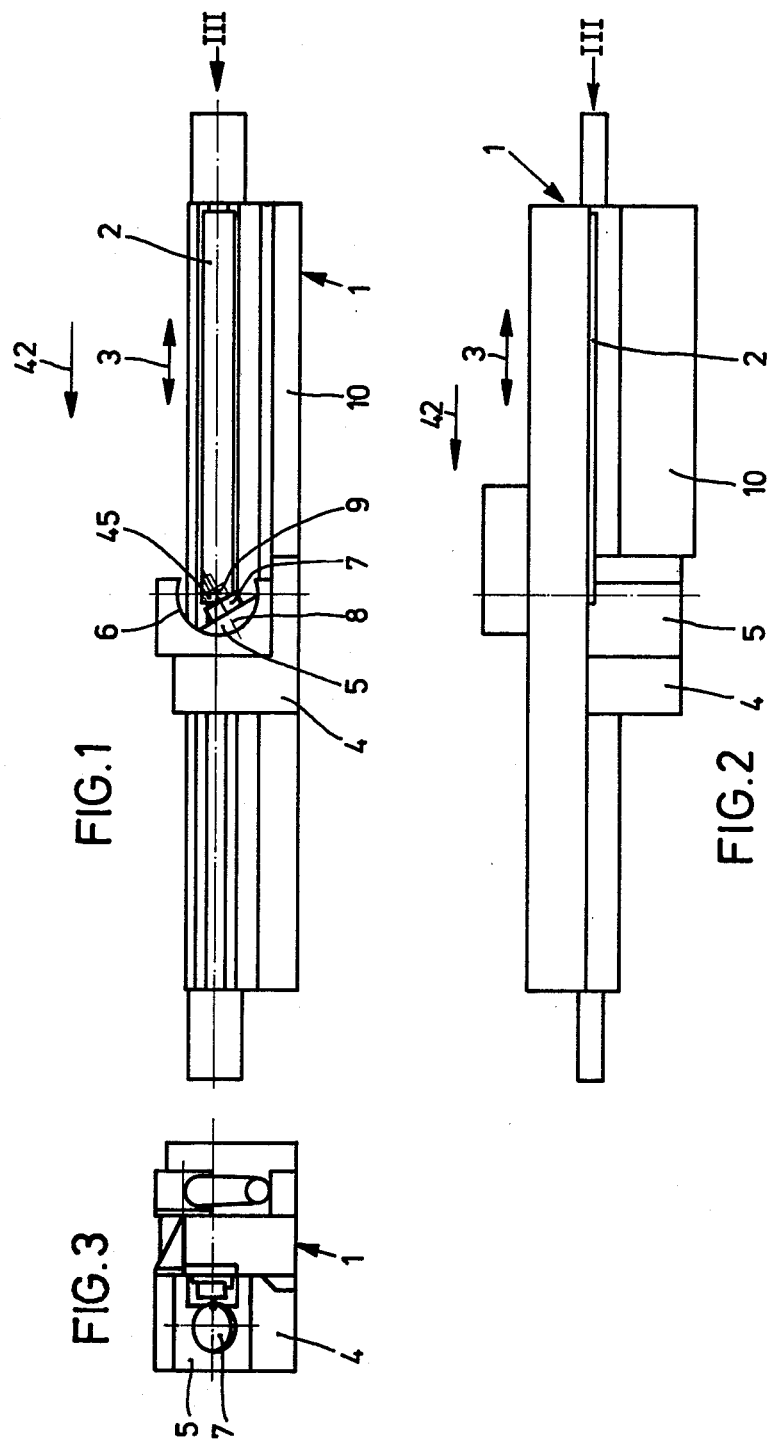

HORIZONTAL EXTERNAL BROACHING MACHINE

BACKGROUND OF THE INVENTION

This invention relates to horizontal external broaching machines having a horizontally movable tool slide or carriage disposed on a horizontal machine frame, in which the tool slide, which serves to receive a broaching tool, is supported laterally and vertically by means of guide surfaces on guide surfaces of the machine frame, and in which there is disposed, on the tool slide a toothed rack which extends in the direction of movement of the tool carriage and in which a driving pinion provided with corresponding teeth meshes and is adapted to be driven by means of a shaft of a drive motor.

A horizontal external broaching machine of this kind is known, for example, from a leaflet of THE LAPOINTE MACHINE TOO COMPANY, entitled "SRHE LAPOINTE Horizontal Broaching Machine", in which the tool carriage is supported in relation to the machine frame on the one hand by two lower guide surfaces, which are inclined in relation to the vertical and in relation to the horizontal, and by an upper guide surface which is likewise inclined in relation to the vertical and to the horizontal. The rack is disposed on the underside of the tool slide or carriage with its teeth lying at the bottom. A drive pinion, which like the rack is provided with herringbone teeth, is disposed below the rack. Despite the extremely heavy construction of this machine, manufacturing accuracy in the range of a few μm is not possible with its aid.

SUMMARY OF THE INVENTION

It is the principal object of the present invention to provide a horizontal external broaching machine of the kind first described above by which extremely great machining accuracy can be achieved.

According to the present invention there is provided a horizontal external broaching machine having a horizontally movable tool slide disposed on a horizontal machine frame, the tool slide, which serves to receive a broaching tool, being supported laterally and vertically, by means of guide surfaces, on guide surfaces of the machine frame, and in which the tool slide is provided with a toothed rack which extends in the direction of movement of the tool slide and in which a driving pinion provided with corresponding teeth meshes. The pinion is adapted to be driven via a shaft by a drive motor. The center of gravity of the tool slide and of the rack together with the associated drive pinion are disposed on one side of the guide surfaces, the drive pinion being arranged vertically above the rack. The rack and the drive pinion are provided with helical teeth which during driving in the broaching direction, are acted on by a force directed in the direction of the shaft of the drive pinion and intensifying the bearing forces acting on the guide surfaces for the tool slide.

As a result of the above-mentioned arrangement of the guides of the tool slide and of the tool slide drive in relation to one another, it is ensured that the forces acting on the guide surfaces and resulting on the one hand from the dead-weight of the tool slide and on the other hand from the driving forces acting on the rack will be in the same direction. This has the consequence that the bearing forces acting on the guide surfaces through the dead-weight of the tool slide are still further increased during the drivinging of the tool slide in the broaching direction. The guide surfaces are therefore not relieved of load, so that it is reliably ensured that the tool slide will not perform any relative movement in relation to the guide surfaces, which in practice otherwise leads to the manufacturing inaccuracies mentioned. Due to the fact that the rack and consequently also the drive pinion are provided with helical teeth, during the driving of the tool slide in the broaching direction, an additional force similarly directed to the previously mentioned forces acts on the guide surfaces. In addition, horizontal stabilization of the tool slide is also thereby achieved.

In a particularly simple preferred aspect of the present invention, the center of gravity of the tool slide and the rack together with the associated drive pinion is disposed on the opposite side of the guide surface, with respect to the broaching tool.

Furthermore, it is particularly advantageous for the two guide surfaces of the machine frame, which are disposed in a common vertical plane, to be provided to take the horizontal forces. Moreover, it has been found advantageous for a machine frame guide surface which is inclined in relation to the vertical and in relation to the horizontal to be provided to take the vertical forces and to be associated with a web which is provided in the tool slide and extends between the rack and the guide surface. The forces emanating from the rack are thus transmitted without bending loads to the associated guide surface.

BRIEF DESCRIPTION OF THE DRAWINGS

FIG. 1 is a longitudinal side view of an exemplary embodiment of a horizontal external broaching machine according to the present invention, shown diagrammatically.

FIG. 2 is a plan view of the machine shown in FIG. 1.

FIG. 3 is a side view of the machine shown in FIGS. 1 and 2, viewed in the direction of the arrow-headed line III.

DETAILED DESCRIPTION OF THE PREFERRED EMBODIMENT

Figure 4:
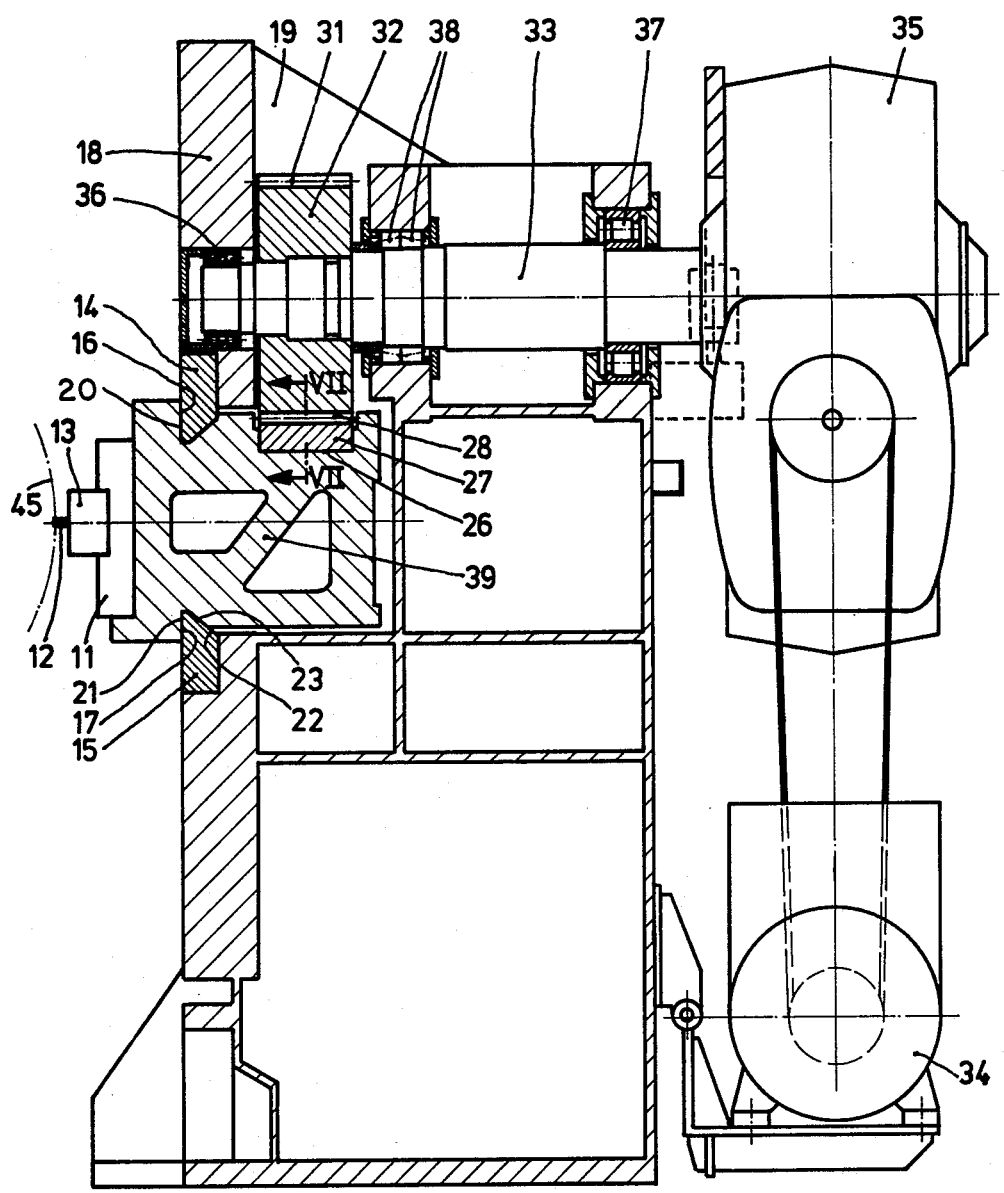
FIG. 4 is a partial vertical cross-sectional view of the machine shown in FIGS. 1, 2 and 3, the section being along line III in FIG. 1, and constituting detailed representation on an enlarged scale.

As shown particularly in FIGS. 1 and 3, an exemplary horizontal external broaching machine according to the present invention includes a horizontally disposed machine frame 1, on which a tool slide 2 is mounted for reciprocal horizontal sliding in accordance with the double arrow-headed line 3 showing the directions of movement. At the side of the machine frame 1 is disposed a so-called angle table 4, which carries a cradle table 5 which is pivotable on a circular arc path defined by surface 6 lying in a vertical plane. On the cradle table 5 is disposed a circular dividing table 7 which is rotatable about its center axis 8. The center axis 8 also extends through the center point 9 of the circular arc path defined by surface 6. At the foot of the machine frame 1 is provided a coolant container 10.

Figure 5:
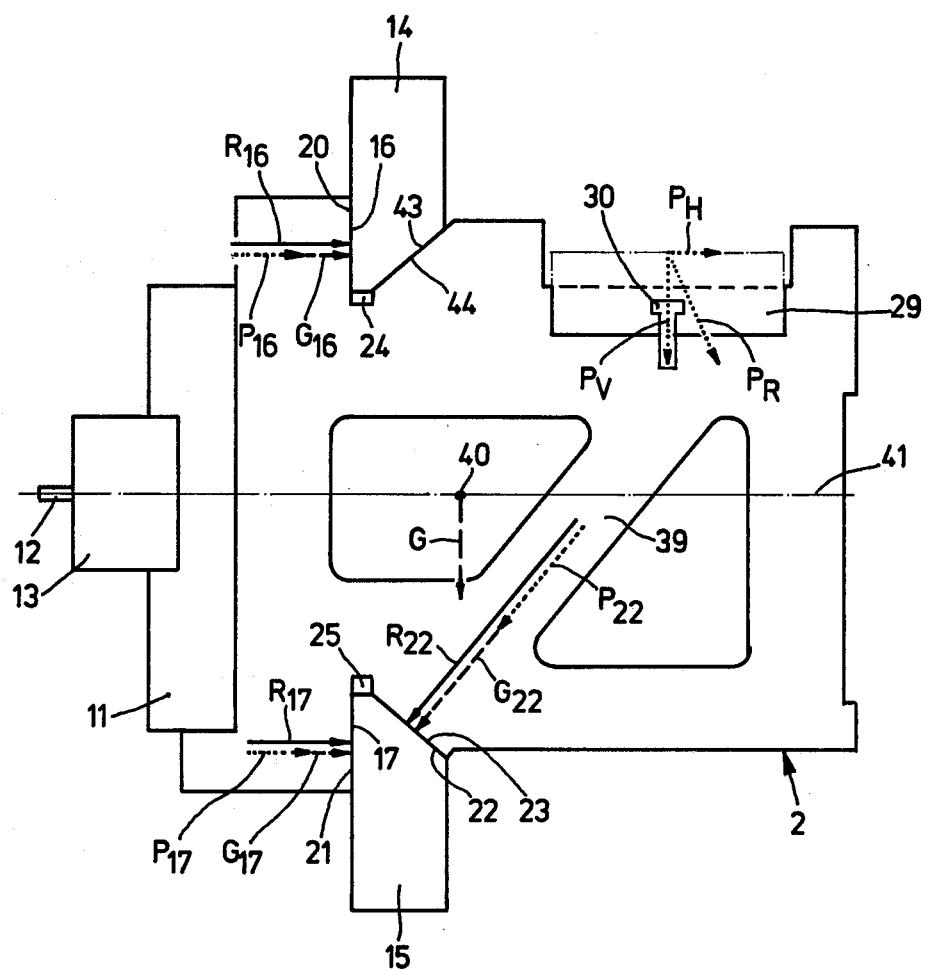
FIG. 5 shows a tool slide corresponding to the cross-sectional representation in FIG. 4, showing the forces acting on the guide surfaces.

On the tool slide 2 is fastened a tool holder 11, to which in turn a broaching tool 12 is fastened by means of an intermediate holder 13, as shown in FIGS. 4 and 5.

The tool slide 2 is guided and supported in relation to the machine frame 1 by means of two guide bars 14, 15 lying in a common vertical plane. The upper guide bar 14 and the lower guide bar 15 both have a vertical guide 16 and 17 respectively, these two guide surfaces 16, 17 also lying in a common vertical plane. These two guide surfaces 16, 17 are open in the direction of the broaching tool 12, which is disposed laterally of the tool slide 2, or in the direction of the angle table 4. The two guide bars 14, 15 are mounted on a particularly sturdy and torsionally stiff vertical wall 18 of the machine frame 1, which wall is braced against the machine frame 1 by means of stiffening webs 19.

The tool slide 2 is provided with guide surfaces 20, 21 which are associated with the two guide surfaces 16, 17 and likewise lie in a common vertical plane, and which bear against the respective guide surfaces 16, 17.

On the lower guide bar 15 is also provided a guide surface 22 which is inclined in relation to the horizontal and to the vertical and which is situated on the side of the lower guide bar 15 remote from the broaching tool 12 or angle table 4. On the tool slide 2 is in turn provided a guide surface 23 which is associated with and lies against the said guide surface 22. In the region of the bottom end of the upper guide bar 14 and of the upper end of the lower guide bar 15 there are provided respective recesses 24 and 25 (FIG. 5) in the tool slide 2, in order to ensure that the mutually associated guide surfaces will lie correctly against one another without edge pressure.

On the upper face of the tool slide 2, on the opposite side of the guide bars 14, 15 with reference to the broaching tool 12, a corresponding recess 26 in the tool carriage 13 contains a toothed rack 27 which extends in the direction of movements indicated by the line 3 and which on its upper face is provided with helical teeth 28. This rack lies at each of its two end faces against a stop surface 29 and is fastened by means of screws 30 in the bottom of the recess 26. A drive pinion 32 provided with corresponding helical teeth 31 meshes from above with the inclined teeth 28 of the rack 27, the pinion 32 being adapted to be driven via a shaft 33, disposed horizontally and perpendicularly to the direction of movement 3, by an electric drive motor 34, fastened on the machine frame 1, by way of reduction gearing 35. At its free end and in the proximity of the reduction gearing 35 the shaft 33 is radially mounted by means of cylinder roller bearings 36, 37 respectively, and in the proximity of the drive pinion 32, it is mounted radially and axially by means of two tapered roller bearings 38 in an X arrangement. As can be seen in FIG. 4, the bearings are fastened in the usual manner.

The tool slide 2, which is in the form of a hollow box, has a diagonnaly extending rib 39 which extends from the rack 27 to the guide surface 23 and in its longitudinal direction is substantially at right-angles to the guide surface 23. The center of gravity 40 on the tool slide 2 lies on the opposite side of guide surfaces 16, 17, 20, 21, 22, 23, with reference to the broaching tool 12. In addition, as can be seen in FIG. 5, the center of gravity 40 lies on the horizontal center longitudinal plane 41 of the tool slide 2, in which the broaching tool 12 also lies and which is symmetrical to the guide bars 14, 15.

In FIG. 5 the forces occurring during operation are shown. The force G, which is directed vertically downwards and is produced by the weight of the tool slide 2 and that of the broaching tool 12 fastened on the latter, acts at the center of gravity 40, and because of the previously explained position of the center of gravity 40 relative to the guide surfaces 16, 17, 20–23, leads to the partial forces $G_{16}$, $G_{17}$, and $G_{22}$, which are likewise shown in dashed lines in FIG. 5 and each of which is directed at right-angles to the respective guide surfaces 16, 17, 22 of the guide bars 14 and 15. In other words, this means that because of the above mentioned position of the center of gravity 40 the tool slide 2 is always pressed with its guide surfaces 20, 21, 23 onto the associated guide surfaces 16, 17, 22 of the guide bars 14, 15.

Because of the helical teeth of the rack 27 and of the drive pinion 32 a force $P_H$, which is directed horizontally and perpendicularly to the broaching direction 42 and also to the vertical guide surfaces 20, 21 of the guide bars 14, 15, acts on the tool slide 2 during broaching, that is to say during the travelling of the tool carriage 2 in the broaching direction illustrated by the arrowheaded line 42 (FIG. 1). Due to the fact that forces pressing them apart act on two teeth when the latter roll on one another under load, in the corresponding rotary drive of the drive pinion 32 for moving the tool slide 2 in the broaching direction designated by the line 42, the tool slide 2 is acted on by a force $P_V$ which is directed vertically downward and which together with the force $P_H$ forms the resultant force $P_R$ which is likewise shown as a dotted line. The resultant bearing forces acting on the guide surfaces 16, 17 22 on the one hand through the weight of the tool slide and of the broaching tool 12 and on the other hand through the drive are shown in FIG. 5 in solid lines as resultant forces $R_{16}$, $R_{17}$, and $R_{22}$, while it may be added that the forces $P_{22}$ and $G_{22}$ and thus the resultant force $R_{22}$ on the guide surface 22 extend in the direction of the web 39 and are therefore transmitted by the latter without bending forces.

Figure 6:
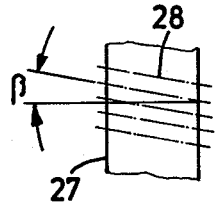
FIG. 6 is a plan view of a toothed rack mounted on the tool slide.

As can be seen in FIG. 6, the helical teeth 28 of the rack 27 are inclined at an angle $\beta$, which may be about 10°, in relation to the direction perpendicular to the broaching direction 42. The previously mentioned laterally directed force component $P_H$ is thereby produced.

Since during the return travel of the tool slide 2 oppositely to the broaching direction designated by the line 42, the helical teeth of the rack 27 and drive pinion 32 have the consequence that the tool slide 2 is acted on by a force which is oppositely directed to the force $P_H$ and which applies a torque tending to lift the tool slide 2 off the guide surfaces 16, 17, 22, an additional auxiliary guide surface 43 is also provided on the guide bar 14, this surface 43 being associated with a corresponding auxiliary guide surface 44 on the tool slide 2. These auxiliary guide surfaces 43, 44 are arranged with mirror-image symmetry to the guide surfaces 22, 23, referring to the center longitudinal plane 41. It may be emphasized that accuracy of guidance of the tool carriage 2 when not loaded, that is to say during its return to the starting position, is not important.

Figure 7:
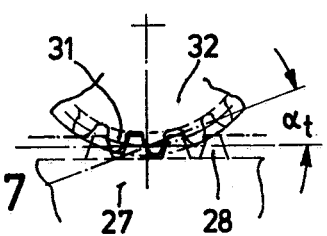
FIG. 7 is a partial, cross-sectional view of a detail of FIG. 4, the section being taken along line VII—VII in FIG. 4.

In FIG. 7 is shown the angle of action $a$, between the helical teeth 28 pf the rack 27 and the helical teeth 31 of the drive pinion 32, which angle is the cause of the force $P_V$.

It may also be added that the shaft 33, and accordingly the rack 27 and the drive pinion 32, may also be inclined in relation to the horizontal, so that, for example, the force $P_V$ acting as the result of the angle of action $\alpha_t$ extends approximately in the direction of the force $P_R$ in FIG. 5. In this case the torque pressing the guides of the tool slide 2 onto the guides on the machine frame 1 becomes even greater. In such a case however the drive pinion 32 is also disposed above, although not necessarily vertically above, the rack 27.

On the circular dividing table 7 is fastened a workpiece 45 shown in phantom, for example a turbine wheel, in whose peripheral surface it is desired to broach recesses, for example so-called fir-tree profiles.

What is claimed is:

1. A horizontal external broaching machine comprising a horizontal machine frame having respective upper and respective lower vertical and inclined guide surfaces; a horizontally movable tool slide having respective upper and respective lower vertical and inclined guide surfaces and being disposed on said horizontal machine frame, said tool slide serving to receive a broaching tool, being supported laterally and vertically by its said vertical and inclined guide surfaces on said vertical and inclined guide surfaces of said machine frame, at least two of said vertical guide surfaces of said machine frame being disposed in a common vertical plane for receiving horizontal forces and at least said lower, inclined guide surface, which is inclined in relation to the vertical and in relation to the horizontal being provided on said machine frame for absorbing vertical forces and receiving said lower, inclined guide surface of said tool slide; a toothed rack on said slide, said rack extending in direction of movement of said tool slide; a driving pinion provided with corresponding teeth meshed with said rack, said pinion being adapted to be driven via a connecting shaft by a drive motor; and wherein the center of gravity of said tool slide is disposed on one side of said guide surfaces and said rack together with said drive pinion is disposed on said one side of said surfaces, said drive pinion being arranged vertically above said rack, and said rack and said drive pinion are provided with helical teeth which during driving in a broaching direction are acted on by a force, directed in direction of said shaft connected to said drive pinion and intensifying bearing forces acting on said guide surfaces for said tool slide.

2. A broaching machine according to claim 1, wherein said center of gravity of said tool slide and said rack together with its associated drive pinion are disposed on that side of said guide surfaces opposite to that side thereof on which said broaching tool is disposed.

3. A broaching machine according to claim 1, wherein said lower, inclined guide surface, which is inclined in relation to the vertical and in relation to the horizontal, is provided on said machine frame to absorb vertical forces and co-operate with a web provided in said tool slide, said web extending between said rack to said given guide surface.

4. A broaching machine according to claim 1, including a web provided in said tool slide, and wherein said lower, inclined guide surface on said frame co-operates with said web provided in said tool slide, said web extending between said rack to said lower, inclined guide surface on said frame.

* * * * *